US006246997B1

(12) United States Patent
Cybul et al.

(10) Patent No.: US 6,246,997 B1
(45) Date of Patent: Jun. 12, 2001

(54) ELECTRONIC COMMERCE SITE WITH QUERY INTERFACE

(75) Inventors: Richard C. Cybul; Robert M. Szabo; James J. Toohey, all of Boca Raton, FL (US)

(73) Assignee: International Business Machines Corp., Armonk, NY (US)

(*) Notice: Subject to any disclaimer, the term of this patent is extended or adjusted under 35 U.S.C. 154(b) by 0 days.

(21) Appl. No.: 09/048,716

(22) Filed: Mar. 26, 1998

(51) Int. Cl.[7] .............................. G06F 17/60; G06F 17/00
(52) U.S. Cl. ................................. 705/27; 705/26
(58) Field of Search ....................... 705/27, 24, 26, 705/1; 709/202; 382/139; 235/380; 707/201

(56) References Cited

U.S. PATENT DOCUMENTS

| | | | |
|---|---|---|---|
| 5,201,010 | * | 4/1993 | Deaton et al. ................. 382/139 |
| 5,347,632 | * | 9/1994 | Filepp et al. .................. 709/202 |
| 5,710,887 | * | 1/1998 | Chelliah et al. ............... 705/26 |
| 5,745,681 | * | 4/1998 | Levine et al. ................. 705/27 |
| 5,848,399 | * | 12/1998 | Burke ............................ 705/27 |
| 5,864,825 | * | 1/1999 | Kobayashi et al. ............. 705/24 |
| 5,870,716 | * | 2/1999 | Sugiyama et al. .............. 705/26 |
| 5,897,622 | * | 4/1999 | Blinn et al. ................... 705/26 |
| 5,898,594 | * | 4/1999 | Leason et al. ................. 364/479.01 |
| 5,909,023 | * | 6/1999 | Ono et al. ..................... 235/380 |
| 5,970,469 | * | 10/1999 | Scroggie et al. ............... 705/14 |
| 6,014,634 | * | 1/2000 | Scroggie et al. ............... 705/14 |

FOREIGN PATENT DOCUMENTS

| | | | |
|---|---|---|---|
| 353003755 | * | 1/1978 | (JP) ........................ G06F/15/20 |
| 401190053 | * | 7/1989 | (JP) ........................ H04L/13/08 |

OTHER PUBLICATIONS

MacPOS, "Retail Point of Sale Software Inventory Control", http://www.macpos.com, 9 pages, Apr. 2000.*

* cited by examiner

Primary Examiner—Tod R. Swann
Assistant Examiner—James W. Myhre
(74) Attorney, Agent, or Firm—Akerman Senterfitt

(57) ABSTRACT

An electronic commerce site, comprising: a point of sale (POS) system, having a POS loyalty database and a POS purchase history database; a list builder tool having an on-line shopping history database; a query interface between the POS system and the list builder tool, the POS system accepting data from an on-line shopper received by the list builder tool and routed through the query interface; the list builder tool returning at least one historical shopping list from the on-line shopping history database to the network browser through the query interface responsive to the on-line shopper's request; and, the on-line shopping history database of the list builder tool being updated with information from the POS system transmitted through the query interface. Communications between the query interface and the list builder tool can be over one or more of the Internet, a wide area network and a local area network.

19 Claims, 1 Drawing Sheet

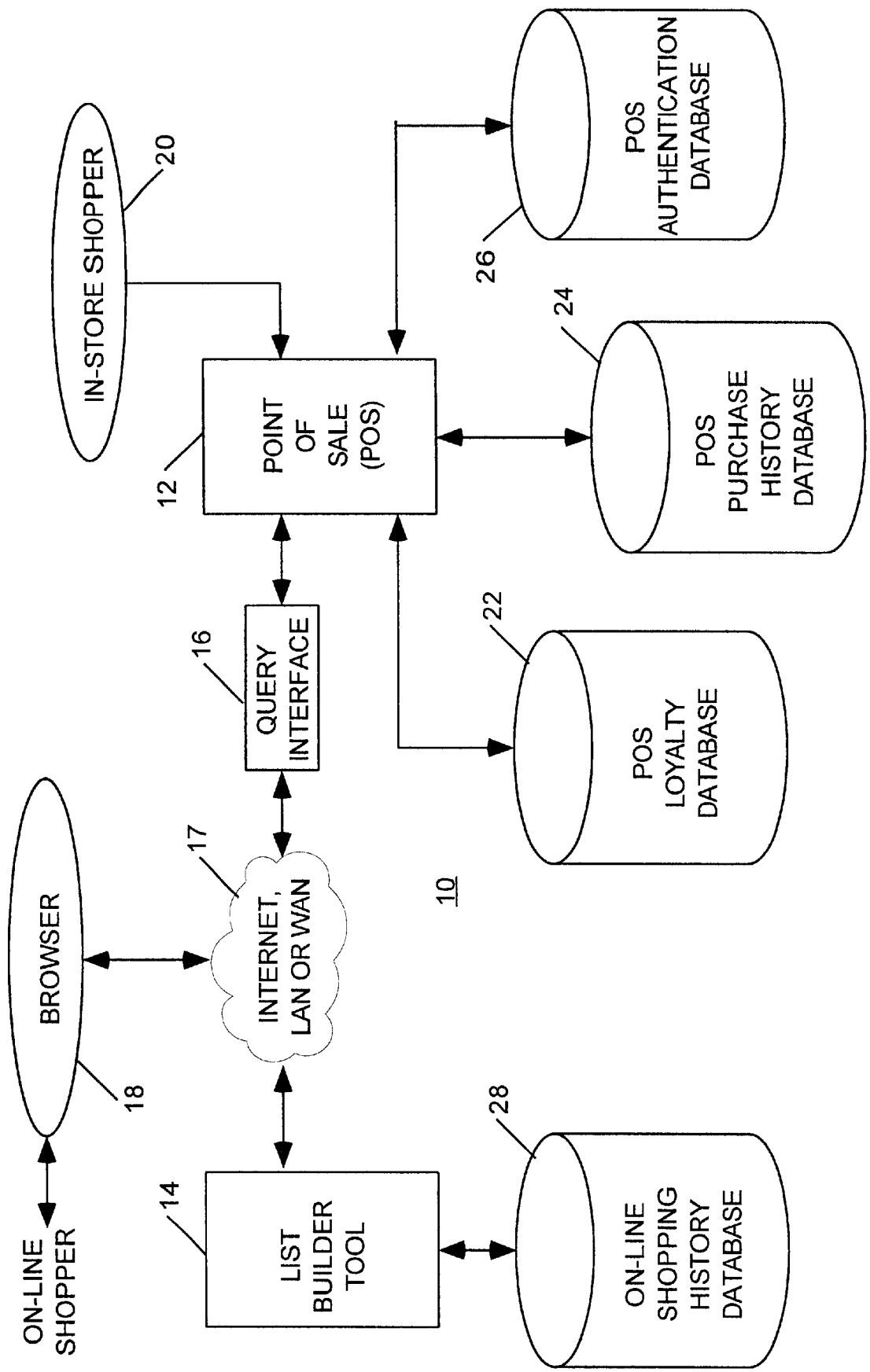

ELECTRONIC COMMERCE SITE WITH QUERY INTERFACE

BACKGROUND OF THE INVENTION

1. Field of the Invention

This invention relates generally to the field of electronic commerce (e-commerce) as can be conducted over the Internet, and in particular, to a query interface for a retailer's point of sale (POS) system to facilitate on-line shopping.

2. Description of Related Art

Developing the Internet as a consumer-direct marketing channel is receiving much focus by dealers of retail goods. However, current practice has identified several contributing factors acting as barriers to wide acceptance of this new marketing channel. First, the typical retail inventory may vary from a few items to tens of thousands of items. Such magnitudes make the first time shopping experience overwhelming. Shopping on-line the first time from an inventory of thousands of items has required a very serious time commitment from the consumer. If the demand is too great, an on-line retailer may lose the customer, let alone lure the customer back on a regular basis for repeat or replenishment shopping activity. Second, consumers may not want to shop exclusively on-line. On occasion, they are likely to return to the conventional store, as opposed to the virtual store embodied in an e-commerce on-line site, to view new items firsthand. Finally, consumers opting to utilize an on-line shopping service are doing so to save time. If consumers cannot save time by shopping on-line they cannot be expected to shop on-line.

Of all the on-line shopping services available today, for example Peapod (accessible at www.peapod.com), PCFoods (accessible at pcfoods.com) and Wal-Mart (accessible at www.wal-mart.com), none takes advantage of the data already being gathered by POS systems on consumer shopping habits and preferences. Any on-line retail shopping service operating over the Internet or offered through any public or private on-line consumer service would benefit from this invention. None of these services can create a personalized, first-time on-line shopping experience.

Only one service provider, Streamline (accessible at www.getstreamlined.com), is attempting to create personalized first-time shopping lists. This is accomplished by going into the shopper's home and literally scanning everything in the shopper's pantry. This method has two major disadvantages. First, if the service provider is performing the scanning function, a shopper has to be willing to let a stranger into their home, and into their pantry and closets and cabinets, to perform the function, an unlikely scenario in today's security-conscious society. Second, if the consumer is provided with the scanning apparatus so they can scan items themselves, the time required to scan the entire household would be too long and hence be unattractive for the shopper, who is interested in on-line shopping to save time.

SUMMARY OF THE INVENTION

In accordance with the inventive arrangements, a unique method is provided for eliminating these barriers to on-line e-commerce shopping by providing a query interface to a retail vendor's point of sale (POS) system that can extract a consumer's prior shopping history from the retail vendor's POS database. The data extracted can then be used by shopping list builder tools to maintain or create an initial shopping list or personal inventory. The relatively small size of the resultant list will facilitate a faster, and therefore more satisfying on-line shopping experience, leading to repeated use of the on-line shopping service.

The POS query interface can advantageously be implemented as a client/server-based tool. A list builder tool can query a POS system for the prior shopping history of a customer, when that customer has previously shopped the POS system or is otherwise of record in the POS system, for example as a result of a registration process. The query can be qualified by, for example, last purchase date, a range of dates, or a specific holiday period. The query can be qualified by other criteria as well. A customer is preferably known to the POS system when that customer is a member of a POS-managed frequent shopper or loyalty program. Security and authentication of the transactions can optionally be supported.

Any invention that can minimize the time that it takes to select items for a first-time purchase from large retail inventories will provide significant advantages to the consumer in terms of time saved. The retailer will also benefit by making the initial on-line shopping experience so attractive that the consumer will return for subsequent, replenishment shopping on-line or in the store.

A method for engaging in electronic commerce (e-commerce) at an e-commerce site, in accordance with an inventive arrangement, comprises the steps of: establishing a point of sale (POS) system, having a POS loyalty database and a POS purchase history database; establishing a list builder tool having an on-line shopping history database; establishing a query interface enabling communications between said POS system and said list builder tool; accepting data from an on-line shopper accessing said list builder tool; enabling the on-line shopper to recall at least one historical shopping list from the on-line shopping history database; and, updating the databases with information from the on-line shopping.

The method can further comprise the step of establishing a POS authentication database for the POS system.

The method can further comprise the step of updating the on-line shopping history database with information from in-store shopping.

The method can further comprise the step of enabling communications between the query interface and the list builder tool over one or more of the Internet, a wide area network and an on-line area network.

The method can further comprise one or more of the following steps: loading the POS loyalty database with a frequent shopper identification (FSID), at least one preferred payment method and demographic information; loading the POS purchase history database with a purchase time stamp and a list of items purchased, and for each item on a given list, the universal product code (UPC), quantity and purchase price; and, loading the on-line shopping history database with purchase histories returned by the POS system.

An electronic commerce (e-commerce) site, in accordance with another inventive arrangement, comprises: a point of sale (POS) system, having a POS loyalty database and a POS purchase history database; a list builder tool having an on-line shopping history database; a query interface between the POS system and the list builder tool, the POS system accepting data from an on-line shopper received by the list builder tool and routed through the query interface; the list builder tool returning at least one historical shopping list from the on-line shopping history database to the network browser through the query interface responsive to the on-line shopper's request; and, the on-line shopping history database of the list builder tool being updated with information from the POS system transmitted through the query interface.

The POS system can further comprise a POS authentication database.

Communications can be enabled between the query interface and the list builder tool over one or more of the Internet, a wide area network and an on-line area network.

The POS loyalty database can be loaded with a frequent shopper identification (FSID), at least one preferred payment method and demographic information for each frequent shopper.

The POS purchase history database can be loaded with a purchase time stamp and a list of items purchased, and for each item on a given list, a universal product code (UPC), a quantity and a purchase price.

The on-line shopping history database can be loaded with purchase histories returned by the POS system.

The e-commerce site can be embodied in a computer or a computer network, having one or more computers programmed with respective routine sets of instructions.

BRIEF DESCRIPTION OF THE DRAWINGS

The sole FIGURE is a block diagram of an e-commerce site with a query interface in accordance with the inventive arrangements.

DETAILED DESCRIPTION OF THE PREFERRED EMBODIMENTS

A block diagram of an e-commerce site 10 having a POS system and a POS system query interface is shown in the FIGURE. The e-commerce site comprises, in broad terms, a POS system 12 of the kind that supports a frequent shopper or loyalty program and a list builder tool 14. The POS system can be like any of the POS systems now in use in many retail stores and stores of retail chains. IBM currently markets a POS system with loyalty program capabilities. The list builder tool 14 can be like any of the list builder tools now in use in various e-commerce sites. In this regard, the POS system and the list builder tool are to be thought of as generic examples of their respective functions. The inventive arrangements taught herein are related to the manner in which the POS system and the list builder tool are arranged with respect to one another to create a unique query interface which facilitates shopper use of the e-commerce site, rather than to the specific operational details of the POS system and the list builder tool in and of themselves.

The POS system 12 must have two sets of information in order for the query interface to be implemented, and optionally, a third database. The required databases are represented in the drawing as a POS loyalty database 22 and a POS purchase history database 24. The optional database is represented by a POS authentication database 26. The POS system can be implemented as a stand alone computer server or as a local area network (LAN) or as a wide area network (WAN). The databases 22, 24 and 26 can reside in the same computer as the server or in one or more separate computers on a LAN or WAN, or can even be connected over the Internet.

The list builder tool must have a set of information pertaining to historical purchase data of the e-commerce site shoppers, represented by the on-line shopping history database 28.

On-line shoppers can access the e-commerce site through a web browser 18 and the Internet, a WAN and/or a LAN, represented by cloud 17. On-line shoppers access the list builder tool 14. A client/server query interface 16 is an interface that allows access to the POS system from the list builder tool. The query interface 16 can communicate with the list builder tool over a LAN or WAN or even the Internet as shown by cloud 17. In a typical transaction, the POS system accepts data identifying an on-line shopper, received by the list builder tool and routed through the query interface. It should be appreciated that the relationship of the query interface to the list builder tool, the POS system, the browser and the Internet, LAN or WAN cloud is represented at a high systems or conceptual level, for purposes of simplifying the accompanying explanation, rather than being shown strictly topologically.

As a practical matter, shoppers will, at one time or another, want to shop in person, represented by a personal interface 20 for an in-store shopper. It is an aspect of the inventive arrangement that the in-store shopping activities of loyalty customers will become part of the on-line shopping history database through the query interface 16. Accordingly, the list builder tool 14 can advantageously request purchase histories from the POS system 12 on demand.

A POS system that supports a frequent shopper or loyalty program, a database of loyalty customers, a database of historical purchase data indexed by loyalty customer, a client/server query interface and a list builder tool with an on-line shopping history database together enable a list builder tool to efficiently find and select the past shopping history of respective shoppers and import that data to the list builder's on-line historical purchase list database, thereby making it available for the shoppers' first and subsequent on-line shopping experiences.

The POS system can also be used to provide consumers with the flexibility to still shop at the real store while continuing to maintain an on-line record of those purchases. This can be accomplished by allowing the list builder tool to request purchase histories from the POS system on demand.

Creating and maintaining electronic shopping lists has several aspects. The unique combination described hereinafter in detail allows an arbitrary list building tool to access a customer's shopping history from a selected POS system. Methods for implementing an e-commerce site as described herein can support any present or future POS system. For present POS systems, implementation will be largely dictated by the architecture of the POS system. At a minimum, the POS system must provide a loyalty program, that is a frequent shopper card, or the electronic equivalent, and track purchases based on the loyalty or frequent shopper card identification. Future POS systems need only to incorporate these elements into their basic design.

Basic information about the loyalty customers or frequent shoppers is kept in a first database. This database can contain, without limitation: a frequent shopper identification (FSID), preferred payment methods and demographic information such as name, address, family size, number of children and the like. This information is used to locate the shopper's purchase history via the FSID. Optionally, some or all of this data may be returned to the shopping list builder tool to support custom profile and configuration features unique to a particular shopping list builder tool.

A second database of historical purchase data, indexed by loyalty customer, is defined by the POS system and should minimally contain, on a per loyalty customer basis, a purchase time stamp and a list of items purchased. For each item on a given list, the following information should be provided, at a minimum: the universal product code (UPC), quantity and purchase price. This information can be combined to provide an historical list for a given shopping experience.

A list builder tool or service is provided with a third database, having on-line shopping history data. This is the intended client application and consumer of the data provided by the inventive arrangements taught herein. The purchase histories returned by the POS system are used to initialize a shopper's personal store inventory. Information about the shopper that is optionally returned can be used to initialize the shopper's personal shopping preferences.

A fourth database, which is optional but presently preferred for maximum efficiency of operation of the e-commerce site, contains configurable security and authentication features.

The methods taught herein are described essentially as software based, including a client/server query interface with configurable security and authentication features (which are optional). Other implementations are not intended to be excluded, including manual processing. The POS system can respond to queries against the database of historical purchase data, indexed by loyalty customer, using a communications method defined by the POS system. For example, queries could be handled over a TCP/IP network using special sockets. Furthermore, the communications protocol should be flexible enough to allow the POS system to batch queries and respond later or to respond in real-time. As a result, the client should be equally flexible.

At minimum, a query to the POS system should contain the FSID and a function code. For purposes of explaining the inventive arrangements, two function codes have been minimally defined. The first is a request for profile information for the addressed loyalty customer. The second is a request for a purchase history. When requesting a purchase history, a date must be provided. The date can be specified in several forms, for example a specific date (Jul. 10, 1997), an explicit range of dates (Jul. 10, 1997, Jul. 20, 1997), an implicit date (last on-line purchase or last in-store purchase), or an implicit range of dates (Thanksgiving, Halloween, or any other holiday).

In response to any of the above queries, the POS system (server) will return the data requested or a failure indication, if any. The data returned by the POS system cannot, of course, exceed that which it has available in its database of historical purchase data and the database of loyalty customers.

The inventive arrangements can be used to extract data from a retail vendor's POS system. The data so extracted can then be used by existing shopping list builder tools to create an initial shopping list or personal inventory for the on-line shopper.

Subsequent invocations of the methodology can be used to update electronic shopping lists. The relatively small size of the resultant list will facilitate a faster, and therefore more satisfying, on-line shopping experience, leading to repeated use of the on-line shopping service.

What is claimed is:

1. A method for engaging in electronic commerce (e-commerce) at an e-commerce site, comprising the steps of:
   establishing a point of sale (POS) system, having a POS loyalty database and a POS purchase history database;
   establishing a list builder tool at said e-commerce site having an on-line shopping history database separate from said POS purchase history database;
   establishing a query interface enabling communications between said POS system and said list builder tool;
   accepting data from an on-line shopper accessing said list builder tool;
   enabling said on-line shopper to recall at least one historical shopping list from said on-line shopping history database;
   capturing information generated by on-line shopping said e-commerce site; and,
   updating said on-line shopping history database and said POS purchase history database with said captured information from said on-line shopping.

2. The method of claim 1, further comprising the step of establishing a POS authentication database for said POS system.

3. The method of claim 1, further comprising the steps of:
   capturing information generated by in-store shopping; and,
   updating said databases with said captured information from said in-store shopping.

4. The method of claim 1, further comprising the step of enabling communications between said query interface and said list builder tool over at least one of the Internet, a wide area network and a local area network.

5. The method of claim 1, further comprising the step of enabling communications between said query interface and said list builder tool over at least two of the Internet, a wide area network and a local area network.

6. The method of claim 1, further comprising the step of loading said POS loyalty database with a frequent shopper identification (FSID), at least one preferred payment method and demographic information.

7. The method of claim 1, further comprising the step of loading said POS purchase history database with a purchase time stamp and a list of items purchased, and for each item on a given list, the universal product code (UPC), quantity and purchase price.

8. The method of claim 1, further comprising the step of loading said on-line shopping history database with purchase histories returned by said POS system through said query interface.

9. The method of claim 1, further comprising the steps of:
   loading said POS loyalty database with a frequent shopper identification (FSID), at least one preferred payment method and demographic information;
   loading said POS purchase history database with a purchase time stamp and a list of items purchased, and for each item on a given list, the universal product code (UPC), quantity and purchase price; and,
   loading said on-line shopping history database with purchase histories returned by said POS system through said query interface.

10. An electronic commerce (e-commerce) site, comprising:
    a point of sale (POS) system remote from said e-commerce site, having a POS loyalty database and a POS purchase history database;
    a list builder tool at said e-commerce site having an on-line shopping history database separate from said POS purchase history database;
    a query interface between said POS system and said list builder tool, said POS system accepting data from an on-line shopper received by said list builder tool and routed through said query interface;
    said list builder tool returning at least one historical shopping list from said on-line shopping history database to a network browser through said query interface responsive to said on-line shopper's request;

said e-commerce site capturing information generated by on-line purchase transactions;

said POS system capturing information generated by in-store purchase transactions, and, said on-line shopping history database of said list builder tool and said purchase history database of said POS system being updated with said captured information through said query interface.

11. The e-commerce site of claim 10, wherein said POS system further comprises a POS authentication database.

12. The e-commerce site of claim 10, wherein communications are enabled between said query interface and said list builder tool over at least one of the Internet, a wide area network and a local area network.

13. The e-commerce site of claim 10, wherein communications are enabled between said query interface and said list builder tool over at least two of the Internet, a wide area network and a local area network.

14. The e-commerce site of claim 10, wherein said POS loyalty database is loaded with a frequent shopper identification (FSID), at least one preferred payment method and demographic information for each frequent shopper.

15. The e-commerce site of claim 10, wherein said POS purchase history database is loaded with a purchase time stamp and a list of items purchased, and for each item on a given list, a universal product code (UPC), a quantity and a purchase price.

16. The e-commerce site of claim 10, wherein said on-line shopping history database is loaded with purchase histories returned by said POS system through said query interface.

17. The e-commerce site of claim 10, wherein:

said POS loyalty database is loaded with a frequent shopper identification (FSID), at least one preferred payment method and demographic information for each frequent shopper;

said POS purchase history database is loaded with a purchase time stamp and a list of items purchased, and for each item on a given list, a universal product code (UPC), a quantity and a purchase price; and, said on-line shopping history database is loaded with purchase histories returned by said POS system through said query interface.

18. The e-commerce site of claim 10, embodied in a computer programmed with a routine set of instructions.

19. The e-commerce site of claim 10, embodied in a computer network, having at least two computers programmed with respective routine sets of instructions.

* * * * *